(12) United States Patent
Giacomini

(10) Patent No.: US 9,079,340 B2
(45) Date of Patent: Jul. 14, 2015

(54) SYSTEM AND PROCESS OF MOLDING OF PLASTIC MATERIALS

(75) Inventor: Pio Guido Giacomini, Massagno (CH)

(73) Assignee: HERTEK SA, Capolago-Mendrisio (CH)

( * ) Notice: Subject to any disclaimer, the term of this patent is extended or adjusted under 35 U.S.C. 154(b) by 681 days.

(21) Appl. No.: 13/375,917

(22) PCT Filed: Jun. 5, 2009

(86) PCT No.: PCT/IB2009/005867
§ 371 (c)(1),
(2), (4) Date: Jan. 20, 2012

(87) PCT Pub. No.: WO2010/140018
PCT Pub. Date: Dec. 9, 2010

(65) Prior Publication Data
US 2012/0104650 A1    May 3, 2012

(51) Int. Cl.
*B29C 45/16* (2006.01)
*B29C 45/28* (2006.01)

(52) U.S. Cl.
CPC .......... *B29C 45/1606* (2013.01); *B29C 45/16* (2013.01); *B29C 45/164* (2013.01); *B29C 45/1634* (2013.01); *B29C 45/1603* (2013.01); *B29C 45/2806* (2013.01); *B29C 2045/1698* (2013.01)

(58) Field of Classification Search
CPC   B29C 45/16; B29C 45/1603; B29C 45/1606; B29C 45/1634; B29C 45/164; B29C 2045/237; B29C 2045/1698
USPC .................. 425/130, 562; 264/241, 245, 260
See application file for complete search history.

(56) References Cited

U.S. PATENT DOCUMENTS

| 5,894,023 A | 4/1999 | Schramm et al. |
| 6,332,767 B1 * | 12/2001 | Kudert et al. ................. 425/130 |

FOREIGN PATENT DOCUMENTS

| EP | 0 790 116 A2 | 8/1997 |
| EP | 1 231 041 A1 | 8/2002 |
| JP | 57 077543 A | 5/1982 |

(Continued)

OTHER PUBLICATIONS

English language abstract of JP 57077544 A.*
(Continued)

*Primary Examiner* — Joseph S Del Sole
*Assistant Examiner* — Lawrence D Hohenbrink, Jr.
(74) *Attorney, Agent, or Firm* — Young & Thompson

(57) ABSTRACT

A system for molding plastics material, includes:
  at least one injection nozzle (2) with a cylindrical body;
  at least one hot chamber (24) on which the at least one injection nozzle is mounted;
  at least one penetrating ram rod (15) which extends coaxially with the injection nozzle;
  at least two passages (4, 5) for supplying the molding material to the injection nozzle;
  the injection nozzle (2) including:
  at least one containing collar (7);
  at least one injection valve (11) mounted coaxially with the containing collar (7) and having a supply end (13);
  the injection valve (11) including:
  at least a first supply channel (18) for a first molding material;
  at least a second supply channel (19) for a second molding material;
  the first and second injection channels remaining separate as far as the supply end.

13 Claims, 7 Drawing Sheets

(56) References Cited

FOREIGN PATENT DOCUMENTS

| | | | |
|---|---|---|---|
| JP | 57077544 A | * | 5/1982 |
| JP | 06 285912 A | | 10/1994 |
| WO | 99/52699 A1 | | 10/1999 |

OTHER PUBLICATIONS

International Search Report, dated Feb. 15, 2010, from corresponding PCT application.

* cited by examiner

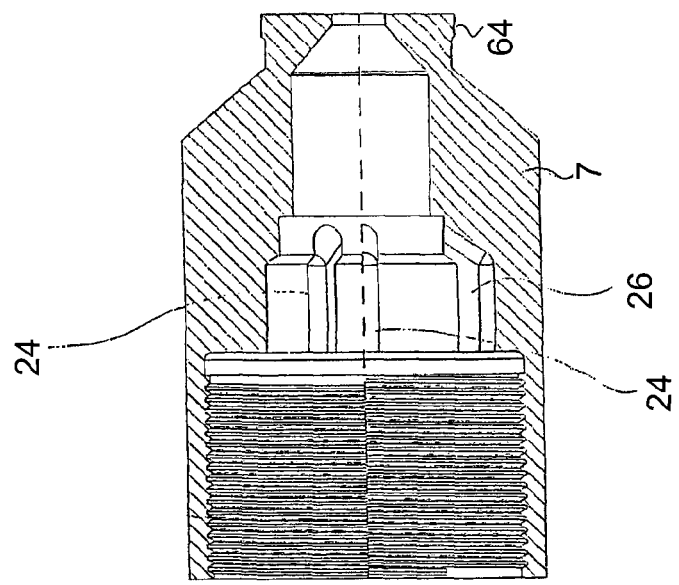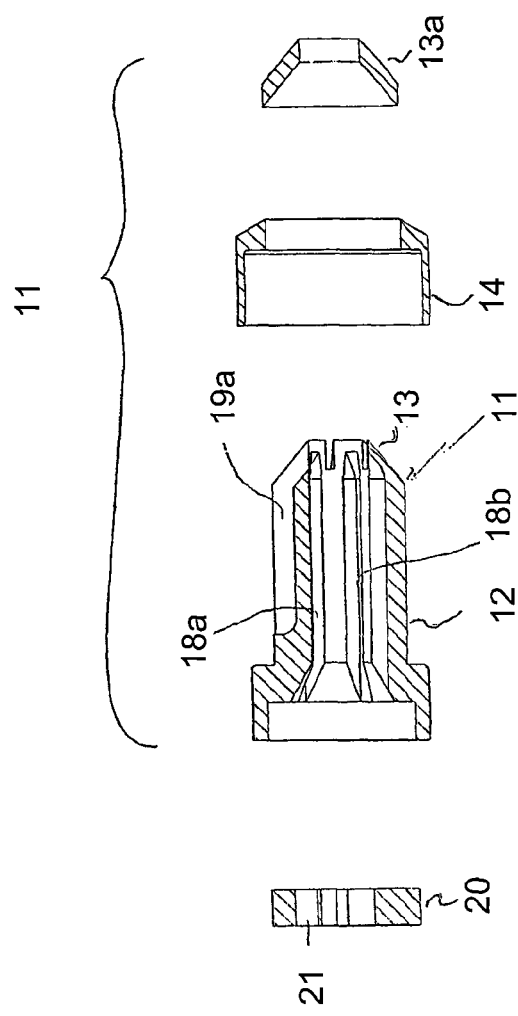
Fig. 3

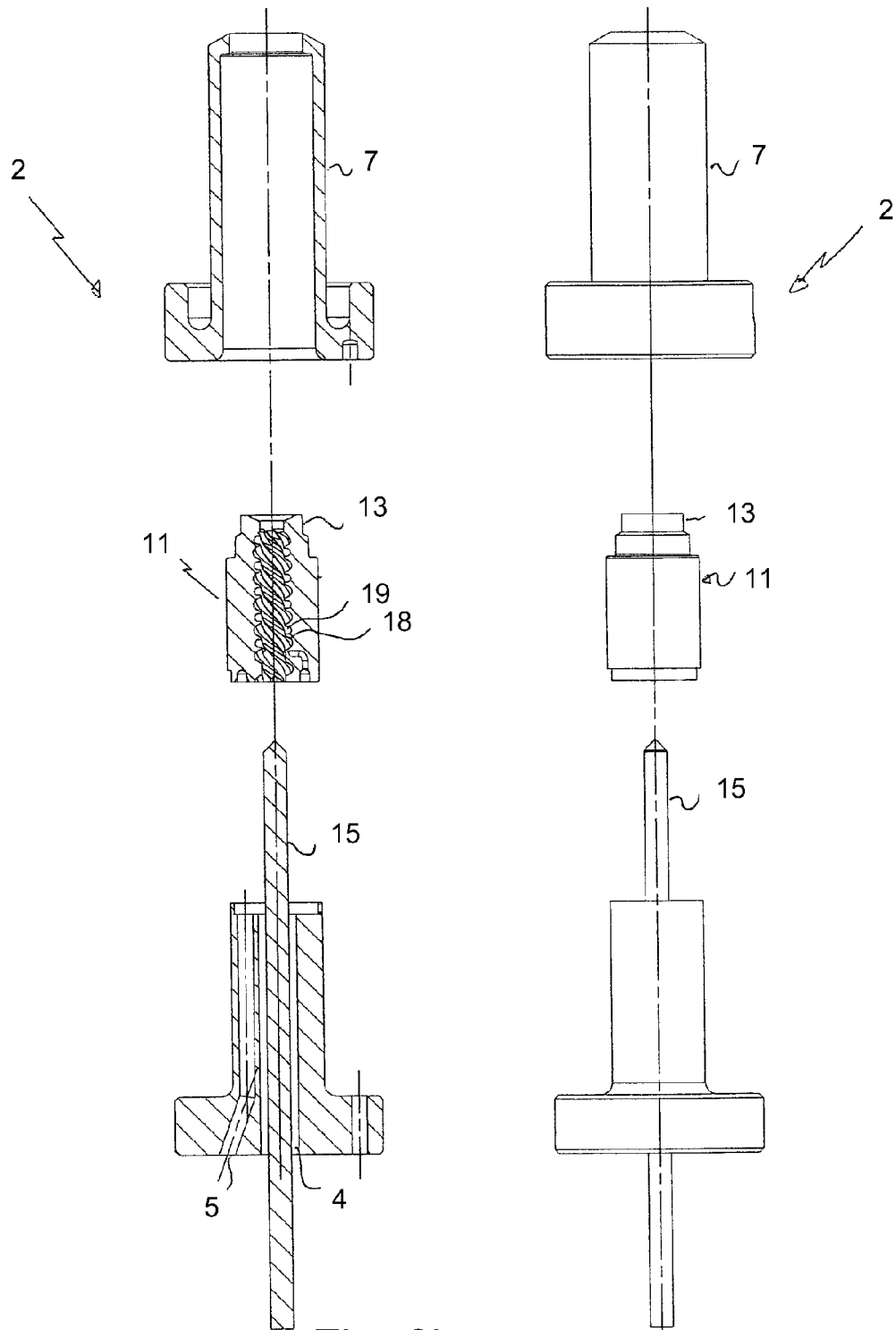

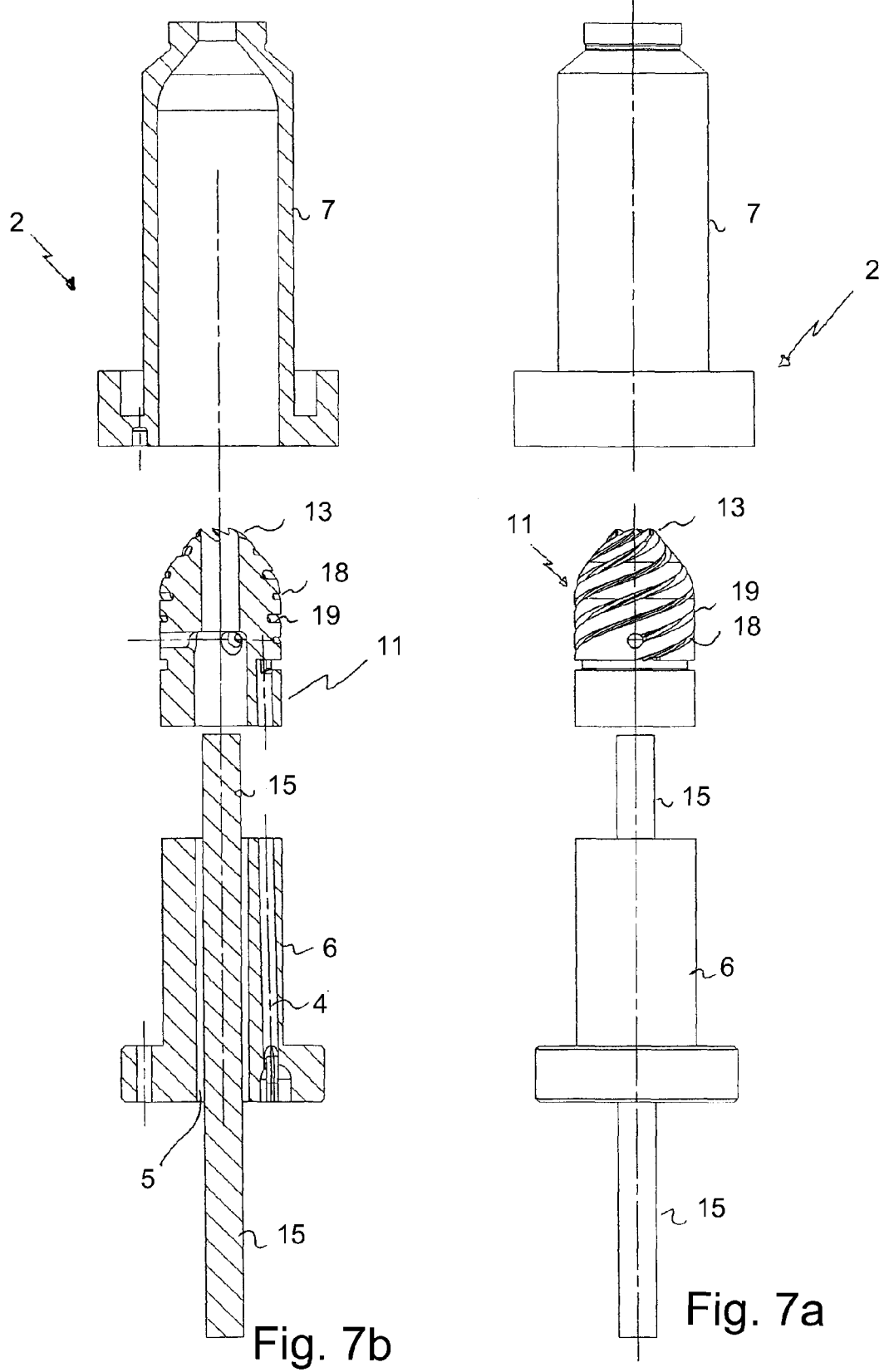

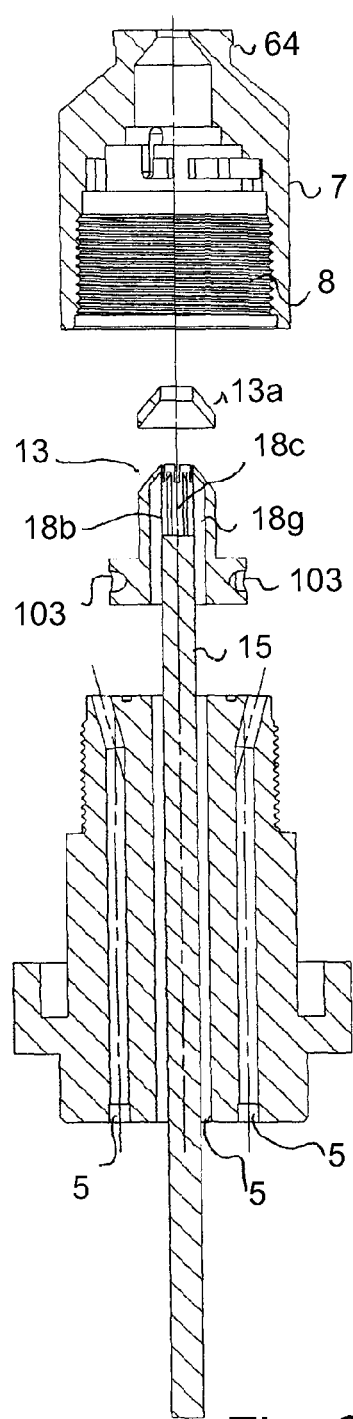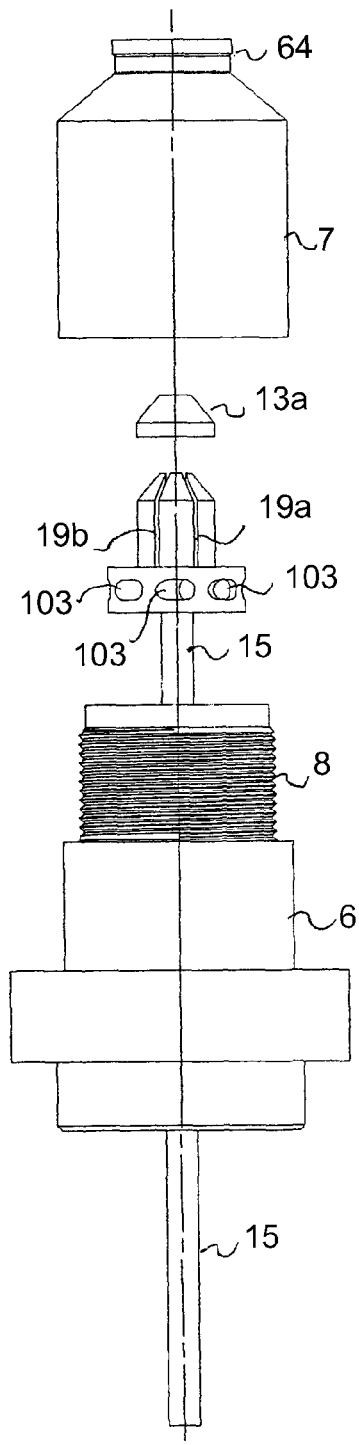
Fig. 8b
Fig. 8a

SYSTEM AND PROCESS OF MOLDING OF PLASTIC MATERIALS

BACKGROUND OF THE INVENTION

1. Field of the Invention

The present invention relates to a system and a process for moulding plastics materials.

Conventionally, an injection nozzle for moulding plastics materials has a cylindrical steel core forming a central longitudinal injection passage for injecting the melted plastics material through one or more injection apertures into a moulding cavity of a mould. An electrical resistance is also wound spirally around the cylindrical core to heat the plastics material passing through the injection passage. The windings of the resistance are usually closer together in the area near the injection aperture, which is closer to the moulding cavity and therefore tends to cool more rapidly than the central areas of the nozzle.

2. Description of the Related Art

EP 1 231 041 describes an example of an injection nozzle for moulding plastics materials which essentially has a cylindrical core, an injection passage and at least one seat formed in the outer lateral surface of the cylindrical core to house at least one resistance element. The resistance element extends to a point near the lower end of the cylindrical core. The nozzle also has a steel body which is essentially in the form of a cup open at the lower end of the cylindrical core, having an inner surface congruent with the inner lateral surface of the core, and having surfaces forming end portions of the injection channel near the injection passage.

BRIEF SUMMARY OF THE INVENTION

In the first place, the applicant has observed that conventional systems of the type described above do not permit the moulding of two different materials, or of the same material in different colours to form decorative elements on the moulded piece.

The applicant has also observed that, with the conventional systems, it is not possible to control the injected material in order to produce varying shades of material, patterns and/or decorative elements directly generated by moulding with the injection nozzle.

The applicant has discovered that, by using a moulding device for injecting two materials at substantially the same point and substantially simultaneously, but in such a way that the two materials remain substantially separate until they are supplied, it is possible to produce varying shades of material, patterns and/or decorative elements which are directly generated by the injection nozzle.

The applicant has also discovered that it is possible, by rotating at least one portion of the nozzle, to produce a moulded piece having varying shades of material, spiral and/or helical patterns, and/or marbled effects generated directly by moulding with the injection nozzle.

In a first aspect, the invention relates to a system for moulding plastics material, comprising:
- at least one injection nozzle with a cylindrical tubular body;
- at least one hot chamber on which said at least one injection nozzle is mounted;
- at least one penetrating ram rod which extends coaxially with said injection nozzle;
- at least two passages for supplying the moulding material to said injection nozzle;

said injection nozzle comprising:
- at least one containing collar;
- at least one injection valve mounted coaxially with said containing collar and having a supply end;

said injection valve comprising:
- at least a first supply channel for a first moulding material;
- at least a second supply channel for a second moulding material;
- said first and second injection channels remaining separate substantially as far as said supply end.

Since the two flows of material remain separate substantially as far as the supply point, it is possible to produce moulded pieces with two different colours in such a way as to form decorative elements on the moulded pieces.

Preferably, the injection valve can have an axial extension L and the supply end can have an axial extension l, where l is less than or equal to 0.25 L. Even more preferably, l is less than or equal to 0.15 L.

Advantageously, the injection valve can comprise:
- a cylindrical valve body having a central through hole for the ram rod;
- at least one flow diffuser keyed on the ram rod and positioned at the end axially opposite the supply end;
- a sealing element mounted circumferentially outside said valve body.

The flow diffuser controls the flow of the material in the first channel entering the valve body, while the sealing element separates into an initial portion the flow of the first material entering the valve body from the second material which enters the valve body in a higher part.

Advantageously, the first inner channel can comprise at least three separate first channels, spaced apart radially, which extend axially through the whole of the valve body. An increase in the number of first channels results in an increase in the number of decorative elements of a given colour and/or material that can be formed in the moulded piece.

Preferably, the three first channels are formed between the inner surface of the valve body and the ram rod.

Advantageously, the ram rod comprises a central rod and an outer sleeve which is axially slidable on the rod.

Preferably, the outer sleeve can comprise a plurality of radial fins for radially delimiting the first channels.

Advantageously, the diffuser comprises a plurality of through holes for separating the flow of material entering the injection valve into a number of flows equal to the number of first channels.

Preferably, the second channel can comprise at least three second channels, spaced apart radially, which extend axially and internally along a portion of the injection valve.

In this case also, an increase in the number of second channels results in an increase in the number of decorative elements of a given colour and/or material that can be formed in the moulded piece.

Preferably, said at least one second channel can alternate circumferentially with a first channel.

The system can advantageously comprise a first circumferential passage interconnecting the second channels entering the valve. This provides a more uniform distribution of the second material entering the valve body.

Advantageously, the system can also comprise a second circumferential passage outside the valve to collect the flow of material from the second supply passage and direct it to the valve body.

Additionally, in order to provide the most uniform possible distribution of the second material entering the first passage and then the valve body, the second circumferential passage is connected to the first passage through passages outside said injection valve.

In a particularly advantageous aspect, the system can include a device for rotating the first and second channels.

By rotating the first and second channels, it is possible to produce a moulded piece having varying shades of material, spiral and/or helical patterns, and/or marbled effects generated directly by moulding with the injection nozzle.

Preferably, the rotation device can comprise motor means and a unit for transmitting the motion from the motor means to the rod.

The motion transmission unit may advantageously comprise a gear wheel keyed on the rod and a rack engaging with a gear wheel and the motor means.

Preferably, the system can also comprise a radial element positioned concentrically on the rod and a guiding and containing collar.

In another aspect, the present invention relates to a process for moulding plastics material with a system comprising:
- at least one injection nozzle;
- at least one hot chamber;
- at least one penetrating ram rod which extends coaxially with said injection nozzle;
- at least one injection valve having a supply end;
said process comprising the steps of:
- feeding at least two flows of different hot materials to the supply end;
- injecting said two flows of different materials simultaneously.

Preferably, the injection step takes place with said at least two flows of different materials kept separate as far as said supply end.

Advantageously, the injection step includes the rotation of at least one of the two flows of different materials.

Even more advantageously, the injection step includes the rotation of all the flows of different materials to produce a moulded piece having varying shades of material, spiral and/or helical patterns and/or marbled effects directly generated by the moulding.

Further features and advantages of the invention will be made clear by the detailed description of some preferred, but not exclusive, embodiments of a system for moulding plastics materials according to the present invention.

BRIEF DESCRIPTION OF THE DRAWINGS

This description is given below with reference to the attached drawings, provided solely for information and therefore without limiting intent, in which:

FIG. 3 is a schematic exploded sectional view of an injection valve and a containing collar of a moulding system according to the invention, the containing collar being shown in sections taken along two separate radial planes;

FIG. 6a is a schematic view of a second embodiment of the present invention;

FIG. 6b is a schematic sectional view of the embodiment of the present invention shown in FIG. 6a;

FIG. 7a is a schematic view of a third embodiment of the present invention;

FIG. 7b is a schematic sectional view of the embodiment of the present invention shown in FIG. 7a.

FIG. 8a is a schematic view of a second embodiment of the present invention;

FIG. 8b is a schematic sectional view of the embodiment of the present invention shown in FIG. 8a.

DETAILED DESCRIPTION OF THE PREFERRED EMBODIMENT

Figure 1:
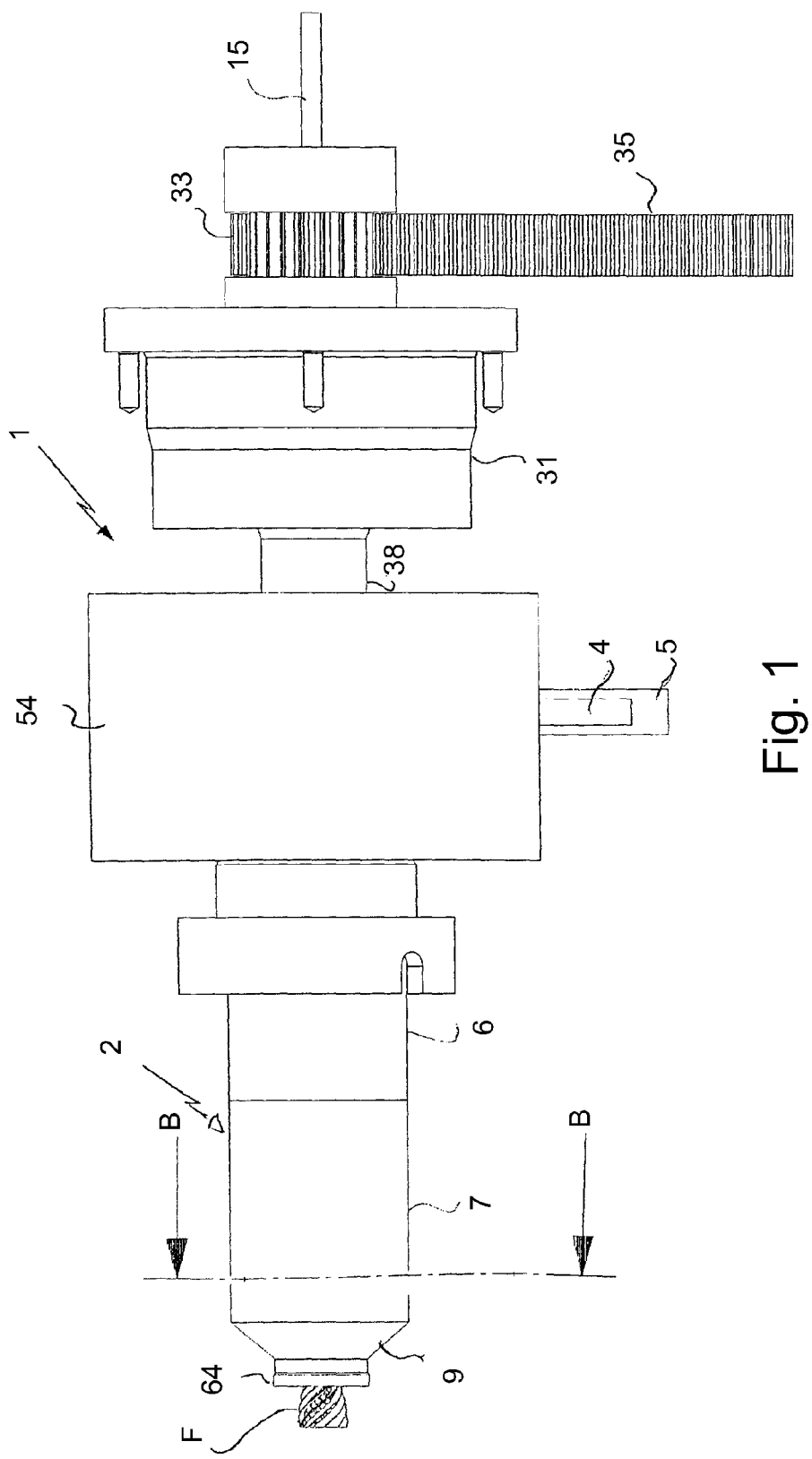
FIG. 1 is a schematic side view of a moulding system according to the invention.
Figure 2:
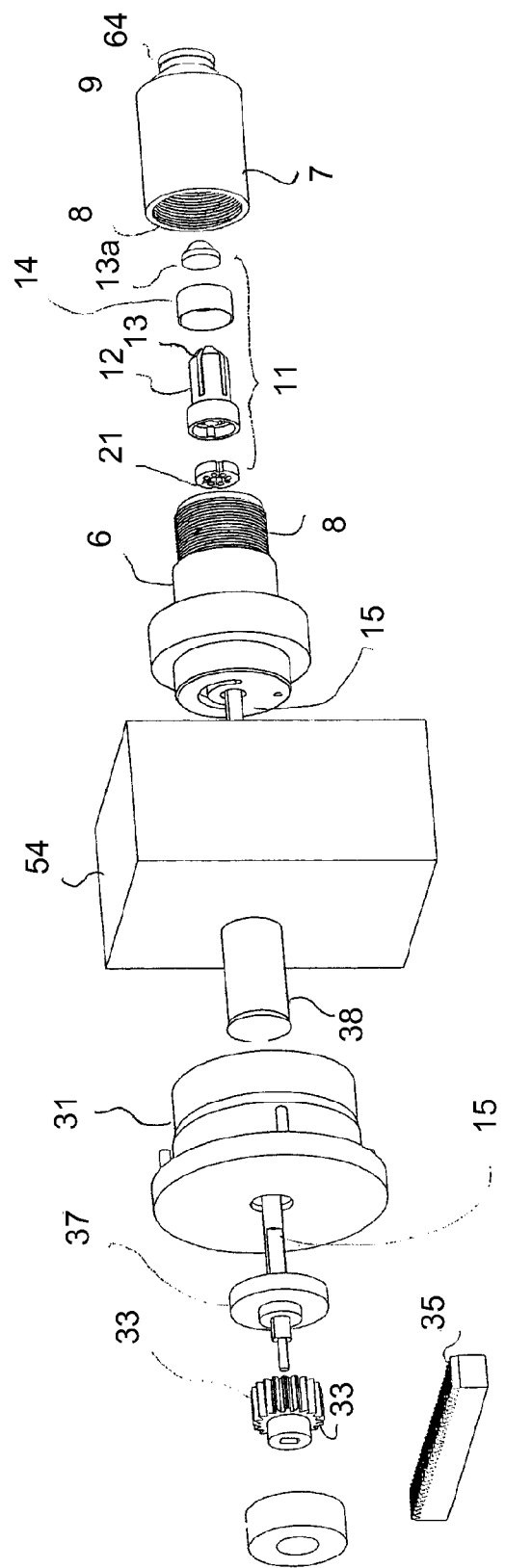
FIG. 2 is a schematic exploded view of a moulding system according to the invention.
Figure 5:
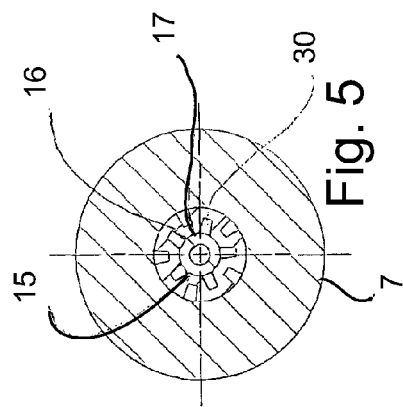
FIG. 5 is a view in section taken along the line B-B of FIG. 1.
Figure 4:
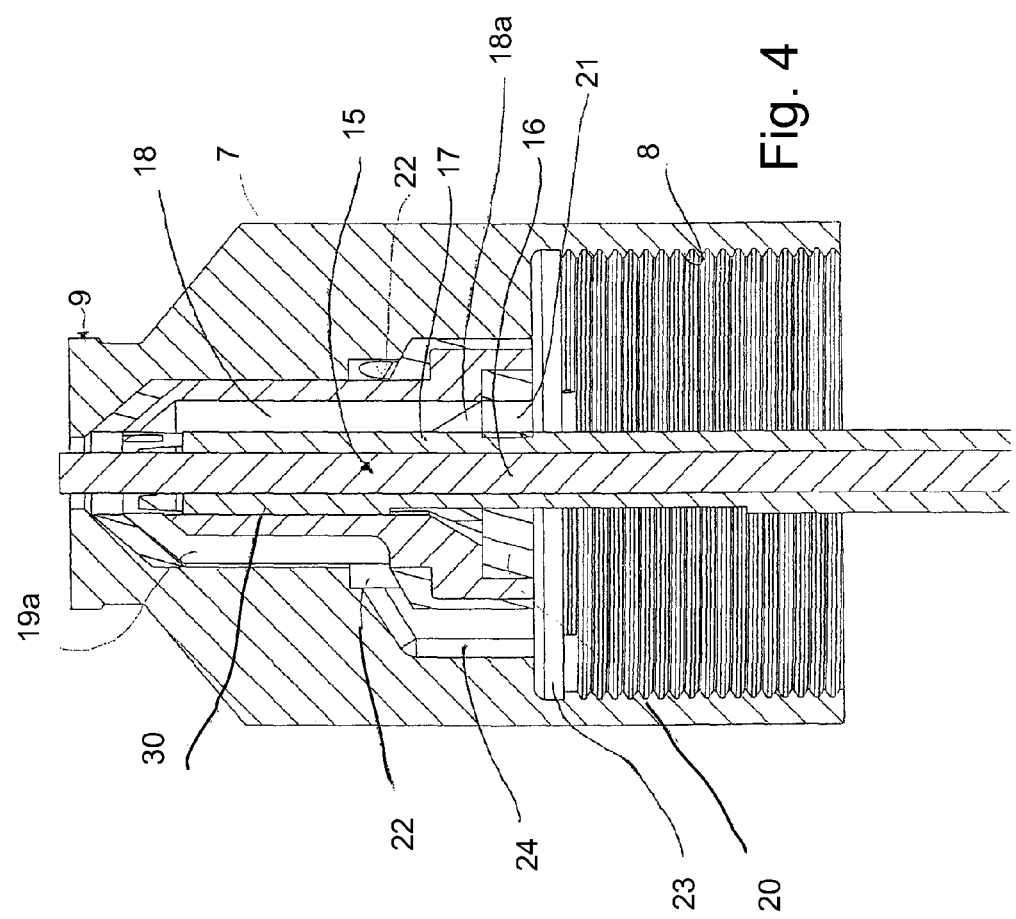
FIG. 4 is a view in section taken along the line A-A of FIG. 1.

With reference to FIGS. 1-5, a system for moulding two plastics materials is identified by the reference numeral 1.

The system comprises at least one injection nozzle 2 with a cylindrical body mounted removably on at least one hot chamber 54 which can keep the material to be moulded at a temperature between 200° and 300°, according to the type of material to be moulded.

The injection nozzle 2 is supplied by at least two separate channels 4 and 5, each supplying a different material, or the same material in two different colours.

In the preferred embodiment shown in FIGS. 1-4, the injection nozzle 2 is composed of two bodies, namely a male body 6 mounted on the hot chamber 54 and a containing collar 7, which has a tapered end 9 for contacting the moulding cavity (not shown in the drawing) which reproduces the shape of the piece to be moulded in negative form.

The male body 6 and the containing collar 7 are joined together by a thread 8, but other mutual fastening elements may be provided.

The tapered end 9 has a support ring 64 on its portion which contacts the moulding cavity.

The injection nozzle 2 contains an injection valve 11 mounted inside the containing collar 7 and coaxially therewith.

The injection valve 11 controls the flows of material in the nozzle 2 and ensures that they are kept separate as far as the supply point.

For this purpose, the injection valve 11 has a cylindrical valve body 12, a flow diffuser 20, a sealing element 14, and a supply end 13 shaped in such a way that, when the nozzle 2 is in place, the supply end is housed in the support ring 64 and contacts the moulding cavity.

The tapered injection end 13 can have a covering element 13a made from material which maintains the high temperature of the material to be injected.

The injection valve 11 comprises at least a first injection channel 18, preferably three channels, and even more preferably five channels 18a, 18b, 18c, 18d, 18e, for a first moulding material, these channels receiving the material from the supply passage 4 and conveying it to the supply end 13.

The injection valve 11 comprises at least a second injection channel 19, preferably three channels, and even more preferably five channels 19a, 19b, 19c, 19d, 19e, which are separate from the first channel 18 and have a shape and size such that they can receive the material from the supply passage 5 and convey it to the supply end 13.

The first injection channels 18a, 18b, 18c, 18d, 18e and the second injection channels 19a, 19b, 19c, 19d, 19e remain separate as far as the tapered injection end 13.

The tapered injection end 13 has an axial extension which is less than 25% of the total axial extension of the valve 11 and less than 15% of the axial dimension of the supply nozzle 2.

Thus the two flows of material being injected into the moulding cavity are kept separate until the point of supply.

The injection nozzle 2 and valve 11 have a ram rod 15 passing through their centres.

The ram rod 15 comprises a central rod 16 and an outer sleeve 17 which is axially slidable on the central rod 16.

The outer sleeve 17 comprises a plurality of radial fins 30 for radially delimiting the first channels 18. In other words, the first channels 18 are formed between the radial fins 30 and an inner surface of the valve body 12.

The flow of the first incoming material from the passage 4 is separated into a number of flows corresponding to said first channels 18 by the diffuser 20, which has a plurality of through holes 21 for this purpose.

The diffuser 20 is keyed on the ram rod 15 and has a number of through holes 21 equal to the number of said first channels 18.

The through holes 21 are positioned circumferentially and spaced apart around the ram rod 15 in positions corresponding to those of the first channels 18.

The first channels 18 extend axially along the whole valve body from the diffuser 20 to the injection end 13 in such a way as to receive the flow of the first material from the passage 4 and supply it, through the supply end 13, to the moulding cavity.

The sealing element 14 is mounted circumferentially outside the valve body 12 at the end opposite the supply end 13, in order to maintain the separation between the first channels 18a, 18b, 18c, 18d, 18e and the second channels 19a, 19b, 19c; 19d; 19e.

The sealing element 14 maintains the separation between the first channels 18a, 18b, 18c, 18d, 18e and the second channels 19a, 19b, 19c; 19d; 19e, at least in a first portion of the axial extension of the injection valve 11.

The second channel 19, as shown in the drawings, comprises at least three second channels, and preferably five second channels 19a, 19b, 19c, 19d, 19e which are spaced apart circumferentially and which extend axially along at least a portion of said valve body 12 from the supply end 13.

In other words, in the upper portion of the injection valve 11, the second channels 19a, 19b, 19c; 19d; 19e run inside the valve 12 and alternate circumferentially with the first channels 18a, 18b, 18c; 18d; 18e, while remaining separate from them.

At the upper edge of the sealing element 14, the second channels emerge from the valve body 12 and are interconnected by a circumferential passage 22 located outside the injection valve 11 and cut into the containing collar 7.

Below the circumferential passage 22 there is provided a second circumferential passage 23 located outside the injection valve 11 and designed to collect the flow of material from at least one supply passage 5 and convey it to the valve body 12 through the first circumferential passage 22.

The second circumferential passage 23 is connected to the first circumferential passage 22 through axial passages 24 located outside the injection valve 11.

Inside the male element 6, that is to say in the portion extending from the hot chamber to the circumferential passage 23, the supply passage could be doubled to supply the circumferential passage 22 from two separate points, in order to provide a uniform supply to the circumferential passage 23 over its whole extension.

In order to obtain a particular decorative effect on the moulded piece, by providing an alternation of colours emerging from the injection point to form spirals and/or helical traces, the system includes a device for rotating the flows of material supplied through the first and second channels.

The rotation device 30 comprises motor means and a unit 32 for transmitting the motion from the motor means to the ram rod 15.

In detail, the motion transmission unit 32 has a gear wheel 33 keyed on the ram rod 15 and a rack 35 engaging with the gear wheel 33 and the motor means, which are not shown in the drawings.

The motor means can be an electric motor suitably designed to move the rack 35.

The movement of the rack 35 causes the rotation of the gear wheel 33 and consequently of the ram rod 15 and the injection valve 11 keyed on the ram rod 15.

By rotating the injection valve 11, the two injected materials are supplied in the form of spirals. In other words, the injected materials form concentric turns of materials of different colours and/or types, in a number equal to the number of the first and second channels. The flow of injected material formed by the concentric turns in a number equal to the number of the first and second channels is shown schematically in FIG. 1 with the reference F.

The system 1 also has a radial element 31 positioned concentrically about the ram rod 15 and a guiding and containing collar 38 for the ram rod 15.

FIGS. 6a-6b show a second embodiment of the system according to the present invention, in which the parts corresponding to those indicated in FIGS. 1 to 5 are indicated by the same reference numerals.

In this embodiment, as in the preceding one, the system 1 for moulding plastics material comprises:
  an injection nozzle 2 with a cylindrical body
  a hot chamber, not shown in FIGS. 6a-6b, on which the injection nozzle 2 is mounted;
  a penetrating ram rod 15 which extends coaxially with the injection nozzle 2;
  at least two passages 4 and 5 for supplying the moulding material to said injection nozzle 2.

In this case also, the injection nozzle 2 has:
  a containing collar 7;
  an injection valve 11 mounted coaxially with the containing collar 7 and having a supply end 13.

The injection valve 11 has:
  at least a first supply channel 18 for a first moulding material;
  at least a second supply channel 19 for a second moulding material;
  said first and second injection channels 18 and 19 remaining separate as far as the supply end 13.

In this embodiment, the first and second channels remain separate as far as the supply end and have a spiral configuration about the ram rod 15.

The first channel 18 and second channel 19 alternate along the axial extension about the ram rod 15.

The first channel 18 and second channel 19 are thus delimited by spiral walls formed inside the valve 11 and by the outer surface of the ram rod 15.

FIGS. 7a-7b show a third embodiment of the system 1 according to the present invention, in which the parts corresponding to those indicated in FIGS. 1 to 5 are indicated by the same reference numerals.

The embodiment shown in FIGS. 7a-7b is wholly similar to that shown in FIGS. 6a-6b, except for the fact that the first channel 18 and second channel 19 are formed on the outer surface of the valve 11.

FIGS. 8a-8b show a fourth embodiment of the system according to the present invention, in which the parts corresponding to those indicated in FIGS. 1 to 5 are indicated by the same reference numerals.

In this embodiment, said at least one first channel 18 comprises at least three separate first channels 18a, 18b, 18c, spaced apart circumferentially, which extend axially along the valve body 12 from the flow diffuser 20 to the supply end 13.

Said second channel 19 is formed by at least three separate second channels 19a, 19b, 19c, spaced apart circumferentially, which extend axially along at least a portion of the valve body 12 from the supply end 13.

The first channels are formed inside the valve body 12 between a suitably cut inner surface of the valve body 12 and the ram rod 15, while the second channels are formed on the outer surface of the valve body 12.

In this embodiment, the diffuser 20 and the sealing element 14 are made in one piece fixed to the valve body 12.

A device for rotating the first and second channels is provided in the form of a set of shaped cavities 103 positioned along the outer surface of the diffuser element 14.

The shaped cavities 103 operate as the blades of a turbine under the action of the flow of material entering through the passages 4, and the rotation of the diffuser element causes the rotation of the valve body 12 which is fixed to it.

The system according to the present invention can be used to implement a moulding process including the following steps:
  feeding at least two flows of different hot materials to the supply end;
  injecting said two flows of different materials into the moulding cavity simultaneously.

Preferably, the injection step takes place with said at least two flows of different materials kept separate as far as said supply end.

Advantageously, the injection step includes the rotation of at least one of the two flows of different materials.

Even more advantageously, the injection step includes the rotation of all the flows of different materials to produce a moulded piece having varying shades of material, spiral and/or helical patterns and/or marbled effects directly generated by the moulding.

The invention claimed is:

1. A system for moulding plastics material, comprising:
   at least one injection nozzle with a cylindrical tubular body;
   at least one hot chamber on which said at least one injection nozzle is mounted;
   at least one penetrating ram rod which extends coaxially with said injection nozzle;
   at least two passages for supplying the moulding material to said injection nozzle;
   said injection nozzle comprising:
   at least one containing collar;
   at least one injection valve mounted coaxially with said containing collar and having a first end and an opposite supply end;
   said injection valve comprising:
   at least a first injection channel for a first moulding material;
   at least a second injection channel for a second moulding material;
   said first and second injection channels remaining separate as far as said supply end of said at least one injection valve,
   wherein said injection valve comprises i) a cylindrical valve body having a central through hole for said ram rod, ii) at least one flow diffuser keyed on said ram rod and positioned at the first end of said injection valve, and iii) a sealing element, wherein said second injection channel comprises at least three second injection channels which are spaced apart circumferentially and which extend axially along at least a portion of said valve body from said supply end; and
   a first circumferential passage to connect said second injection channels.

2. The system according to claim 1, wherein said supply end of said injection valve is a tapered and has an axial extension l, and said injection valve has total axial extension L, where l is less than or equal to 0.25 L.

3. The system according to claim 1, wherein said at least one first injection channel (18) comprises at least three separate first injection channels, spaced apart circumferentially, which extend axially along said valve body from said flow diffuser to said supply end.

4. The system according to claim 3, wherein said at least three first injection channels are formed between an inner surface of said valve body and said ram rod.

5. The system according to claim 3, wherein said ram rod comprises a central rod and an outer sleeve which is axially slidable on said central rod.

6. The system according to claim 5, wherein said outer sleeve comprises a plurality of radial fins for radially delimiting said first injection channels.

7. The system according to claim 1, wherein said flow diffuser comprises a plurality of through holes for separating the flow of material entering said injection valve into a number of flows equal to the number of said first injection channels.

8. The system according to claim 1, wherein said at least one second injection channel alternates circumferentially with a first injection channel.

9. The system according to claim 1, further comprising a second circumferential passage located outside said injection valve for collecting the flow of material from at least one supply passage and for conveying the flow of materials to said valve body through said first circumferential passage, said second circumferential passage being connected to said first circumferential passage through axial passages located outside said injection valve.

10. The system according to claim 1, further comprising a device for rotating said at least one first injection channel and said at least one second injection channel.

11. The system according to claim 10, wherein said rotation device comprises motor means and a unit for transmitting the motion from said motor means to said ram rod.

12. The system according to claim 11, wherein said motion transmission unit has a gear wheel keyed on said ram rod and a rack engaging with said gear wheel and said motor means.

13. The system according to claim 12, further comprising a radial element positioned concentrically with respect to said ram rod and a guiding and containing collar for said ram rod.

* * * * *